(12) United States Patent
Ozeki et al.

(10) Patent No.: US 12,169,342 B2
(45) Date of Patent: Dec. 17, 2024

(54) DISPLAY DEVICE

(71) Applicant: Japan Display Inc., Tokyo (JP)

(72) Inventors: Yoshitaka Ozeki, Tokyo (JP); Nobutaka Ozaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 532 days.

(21) Appl. No.: 17/510,553

(22) Filed: Oct. 26, 2021

(65) Prior Publication Data

US 2022/0050344 A1 Feb. 17, 2022

Related U.S. Application Data

(63) Continuation of application No. PCT/JP2019/050994, filed on Dec. 25, 2019.

(30) Foreign Application Priority Data

Apr. 26, 2019 (JP) .................................. 2019-085517

(51) Int. Cl.
  *G02F 1/1362* (2006.01)
  *G02F 1/1339* (2006.01)
  (Continued)

(52) U.S. Cl.
  CPC ...... *G02F 1/136227* (2013.01); *G02F 1/1339* (2013.01); *G02F 1/134363* (2013.01);
  (Continued)

(58) Field of Classification Search
  CPC ............. G02F 1/136227; G02F 1/1339; G02F 1/134363; G02F 1/134318; G02F 1/13685; G02F 1/136213; G02F 1/1368
  See application file for complete search history.

(56) References Cited

U.S. PATENT DOCUMENTS

| 6,630,977 B1 * | 10/2003 | Yamazaki ........... H01L 27/1248 |
| | | 257/E27.113 |
| 10,109,693 B2 * | 10/2018 | Teraguchi ............ H10K 59/124 |

(Continued)

FOREIGN PATENT DOCUMENTS

| JP | 2008-083291 A | 4/2008 |
| JP | 2009-036947 A | 2/2009 |

(Continued)

OTHER PUBLICATIONS

English translation of Office Action issued in related Japanese Patent Application No. 2019-085517 mailed on Sep. 27, 2022. 3 pages.

(Continued)

*Primary Examiner* — Shaun M Campbell
(74) *Attorney, Agent, or Firm* — K&L Gates LLP

(57) ABSTRACT

According to one embodiment, a display device includes a first substrate and a second substrate opposed to the first substrate. The first substrate includes an insulating substrate, a switching element located on the insulating substrate and having a relay electrode, an organic insulating film covering the switching element and having a first through-hole penetrating to the relay electrode, a pixel electrode being in contact with the relay electrode via the first through-hole, a first capacitance insulating film covering the pixel electrode, a filler having an insulation property filled in at least the first through-hole and located on the pixel electrode and the first capacitance insulating film, and a common electrode covering the filler.

26 Claims, 11 Drawing Sheets

(51) Int. Cl.
  *G02F 1/1343* (2006.01)
  *G02F 1/1368* (2006.01)
(52) U.S. Cl.
  CPC .. *G02F 1/134318* (2021.01); *G02F 1/136213* (2013.01); *G02F 1/1368* (2013.01); *G02F 1/13685* (2021.01)

(56) References Cited

U.S. PATENT DOCUMENTS

| | | | |
|---|---|---|---|
| 2009/0059110 A1* | 3/2009 | Sasaki | G02F 1/133512 349/114 |
| 2013/0140571 A1* | 6/2013 | Imai | H01L 33/005 438/34 |
| 2015/0084023 A1 | 3/2015 | Sato | |
| 2018/0150167 A1 | 5/2018 | Hong | |

FOREIGN PATENT DOCUMENTS

| | | |
|---|---|---|
| JP | 2009-036948 A | 2/2009 |
| JP | 2009-058913 A2 | 7/2013 |
| KR | 10-2014-0091396 A | 7/2014 |

OTHER PUBLICATIONS

International Search Report issued in related International Patent Application No. PCT/JP2019/050994 on Feb. 18, 2020 and English translation of same. 5 pages.

Written Opinion issued in related International Patent Application No. PCT/JP2019/050994 on Feb. 18, 2020. 4 pages.

Office Action issued in related Chinese Patent Application No. 201980095808.3 mailed on Oct. 20, 2023 and English translation of same. 12 pages.

Office Action issued in related Chinese Patent Application No. 201980095808.3 on May 27, 2023. 10 pages.

* cited by examiner

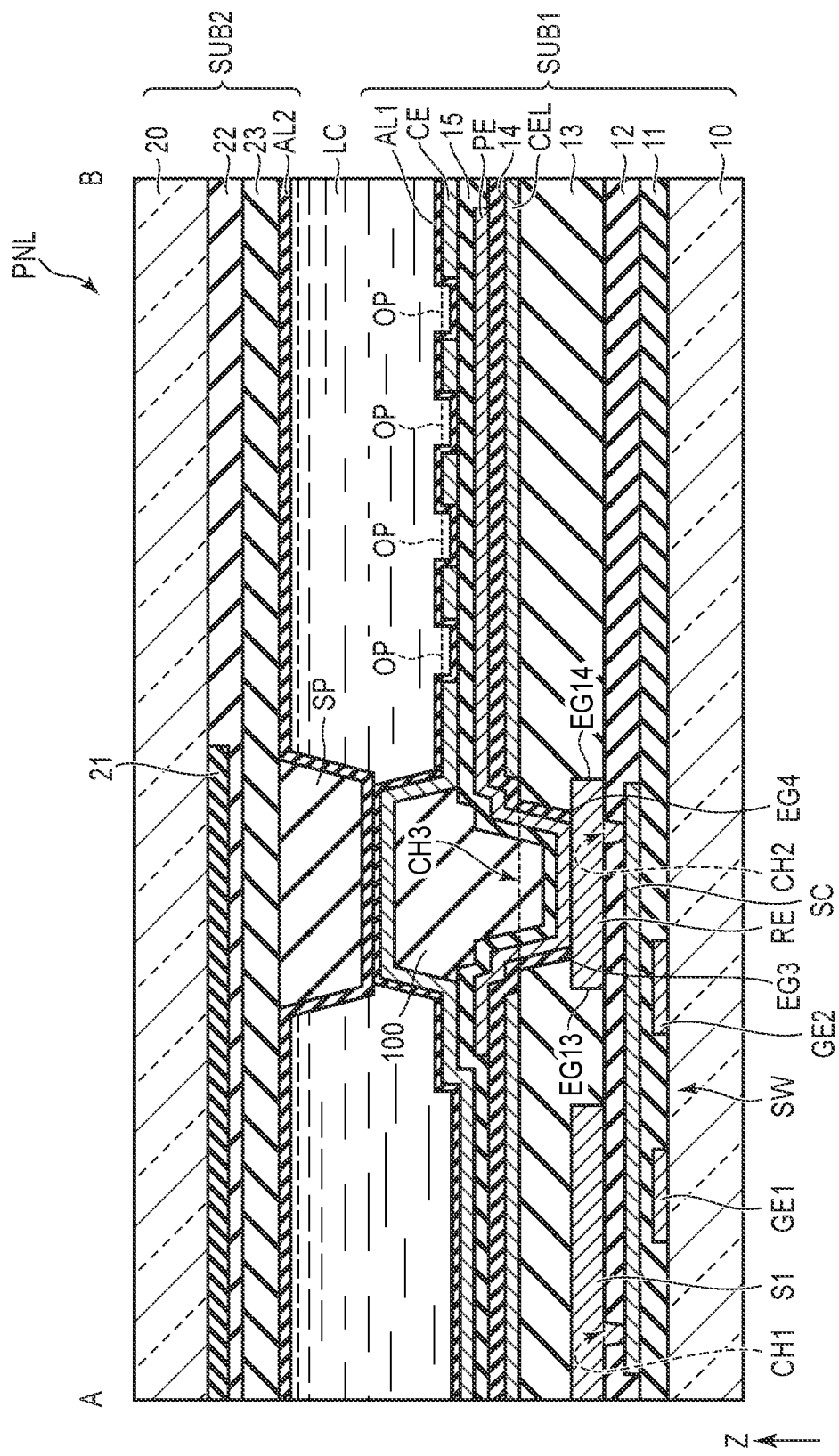
F I G. 3

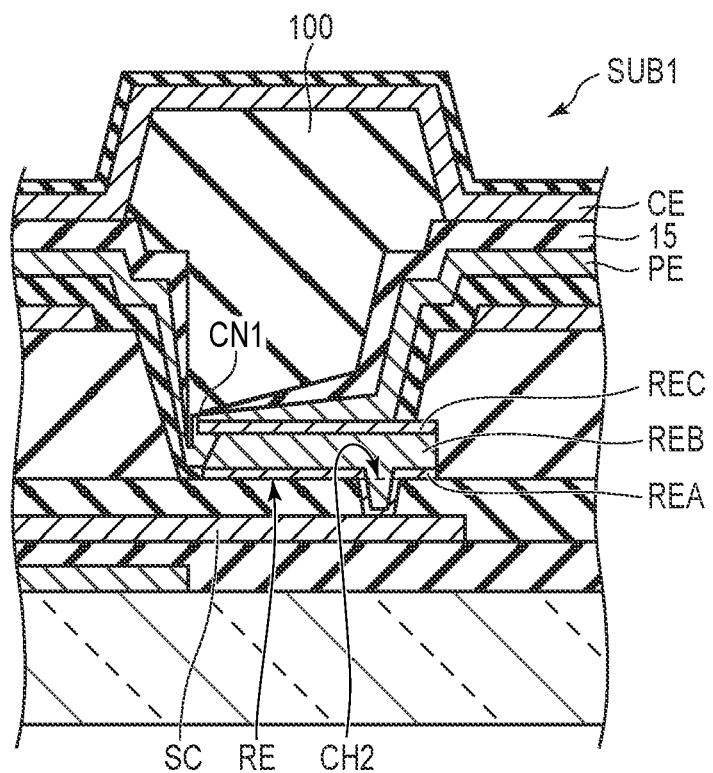
F I G. 6

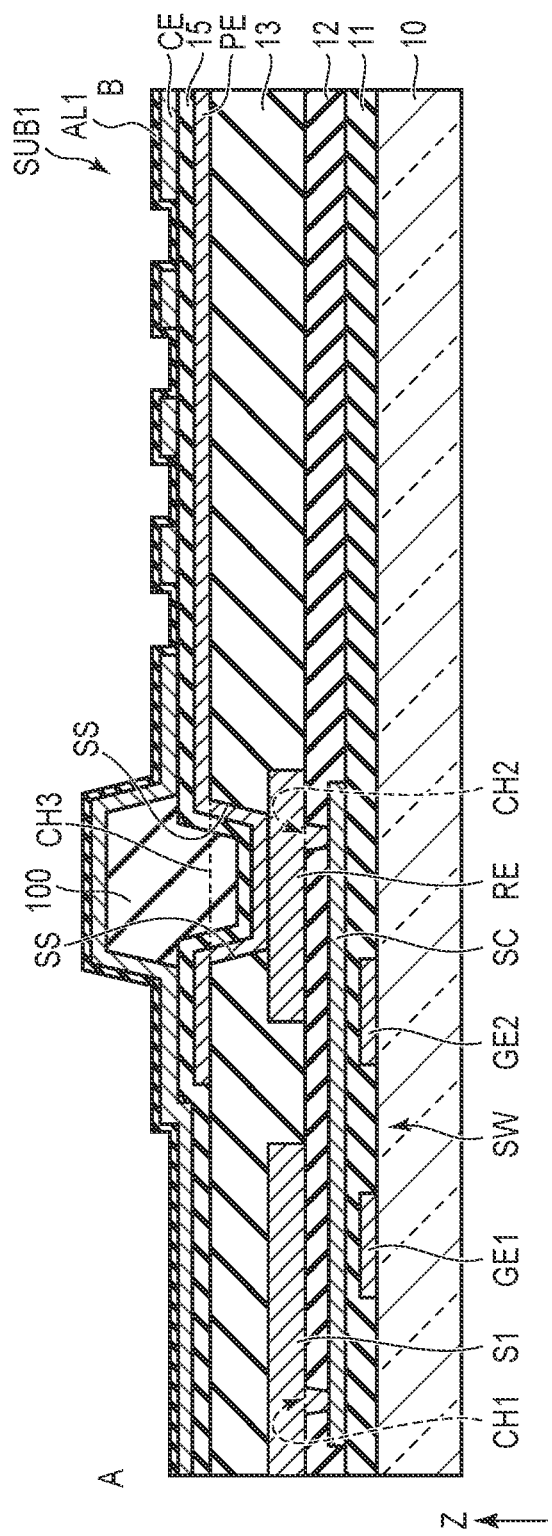
F I G. 10

DISPLAY DEVICE

CROSS-REFERENCE TO RELATED APPLICATIONS

This application is a Continuation Application of PCT Application No. PCT/JP2019/050994, filed Dec. 25, 2019 and based upon and claiming the benefit of priority from Japanese Patent Application No. 2019-085517, filed Apr. 26, 2019, the entire contents of all of which are incorporated herein by reference.

FIELD

Embodiments described herein relate generally to a display device.

BACKGROUND

In a display device, each pixel has a storage capacitance for holding a signal potential applied to a display element. Recently, with the increase of the definition of the display device, there has been demand to reduce the size of a pixel electrode while maintaining the storage capacitance. In order to increase the storage capacitance, such a configuration is known that each pixel comprises three layers of transparent electrodes stacked on top of each other.

BRIEF DESCRIPTION OF THE DRAWINGS

FIG. 3 is a cross-sectional view of a display panel along line A-B shown in FIG. 2.

FIG. 6 is a cross-sectional view showing a detailed configuration example of a relay electrode RE shown in FIG. 5.

FIG. 10 is a cross-sectional view showing the fourth modification of the first substrate.

DETAILED DESCRIPTION

Figure 1:
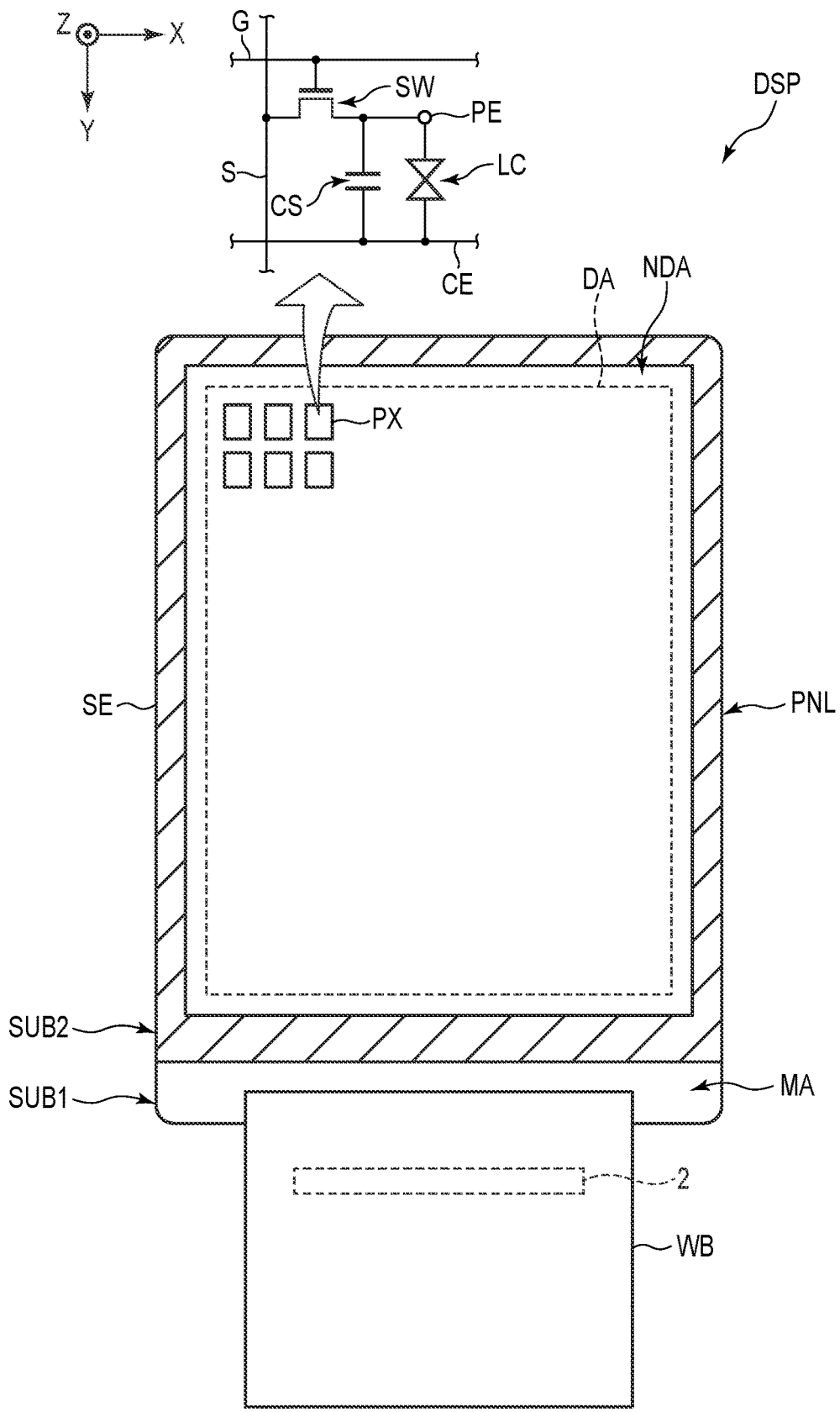
FIG. 1 is an illustration showing the configuration and equivalent circuit of a display device of the present embodiment.

In general, according to one embodiment, there is provided a display device comprising a first substrate and a second substrate opposed to the first substrate. The first substrate comprises an insulating substrate, a switching element located on the insulating substrate and having a relay electrode, an organic insulating film covering the switching element and having a first through-hole penetrating to the relay electrode, a pixel electrode being in contact with the relay electrode via the first through-hole, a first capacitance insulating film covering the pixel electrode, a filler having an insulation property filled in at least the first through-hole and located on the pixel electrode and the first capacitance insulating film, and a common electrode covering the filler.

According to another embodiment, there is provided a display device substrate comprising an insulating substrate, a switching element located on the insulating substrate and having a relay electrode, an organic insulating film covering the switching element, and having a first through-hole penetrating to the relay electrode, a pixel electrode located farther from the insulating substrate than the organic insulating film, and being in contact with the relay electrode via the first through-hole, a first capacitance insulating film covering the pixel electrode, a filler having an insulation property filled in at least the first through-hole, and located on the pixel electrode and the first capacitance insulating film, and a common electrode covering the filler.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed description thereof which is considered redundant may be omitted where appropriate.

FIG. 1 is an illustration showing the configuration and equivalent circuit of a display device DSP of the present embodiment.

A first direction X, a second direction Y and a third direction Z are orthogonal to each other in one example, but may intersect at an angle other than 90 degrees. The first direction X and the second direction Y correspond to directions parallel to the main surface of a substrate constituting the display device DSP, and the third direction Z corresponds to the thickness direction of the display device DSP. In the specification, a direction toward the pointed end of an arrow indicating the third direction Z is referred to as an upward direction (or simply above) and a direction toward the opposite side to the pointed end of the arrow is referred to as a downward direction (or simply below).

The display device DSP comprises a display panel PNL and a wiring board WB mounted on the display panel PNL. The display panel PNL is a liquid crystal display panel, and comprises a first substrate SUB1, a second substrate SUB2 opposed to the first substrate SUB1, a sealing material SE, a liquid crystal layer LC, a signal line S, a scanning line G, a switching element SW, a pixel electrode PE, a common electrode CE and the like. In addition, the display panel PNL comprises a display area DA where an image is displayed, and a non-display area NDA which surrounds the display area DA. It should be noted that the display panel PNL may be a display panel having an electrophoretic element.

The first substrate SUB1 has a mounting portion MA exposed to the outside from the second substrate SUB2. The sealing material SE is located in the non-display area NDA, and bonds the first substrate SUB1 and the second substrate SUB2 together. An area where the sealing material SE is arranged is shown by hatch lines in FIG. 1. The display area DA is located on the inside surrounded by the sealing material SE. The display panel PNL comprises a plurality of pixels PX arranged in a matrix in the first direction X and the second direction Y in the display area DA.

The signal line S, the scanning line G, the switching element SW, the pixel electrode PE, the common electrode CE and the liquid crystal layer LC described above are located in the display area DA. The signal line S extends along the second direction Y, and the scanning line G extends along the first direction X. The switching element SW is composed of, for example, a thin-film transistor (TFT), and is electrically connected to the scanning line G and the signal line S. The pixel electrode PE is electrically connected to the switching element SW. Each pixel electrode PE is opposed to the common electrode CE, and drives the liquid crystal layer LC by an electric field generated between the pixel electrode PE and the common electrode CE. A storage capacitance CS is formed between, for example, an electrode having the same potential as the common electrode CE and an electrode having the same potential as the pixel electrode PE.

The flexible wiring board WB is mounted on the mounting portion MA. In addition, the wiring board WB comprises a drive IC chip 2 which drives the display panel PNL. It should be noted that the drive IC chip 2 may be mounted on the mounting portion MA.

The display panel PNL of the present embodiment may be any of a transmissive type having a transmissive display function of displaying an image by selectively transmitting light from the back surface side of the first substrate SUB1, a reflective type having a reflective display function of displaying an image by selectively reflecting light from the front surface side of the second substrate SUB2, and a transflective type having the transmissive display function and the reflective display function.

Figure 2:
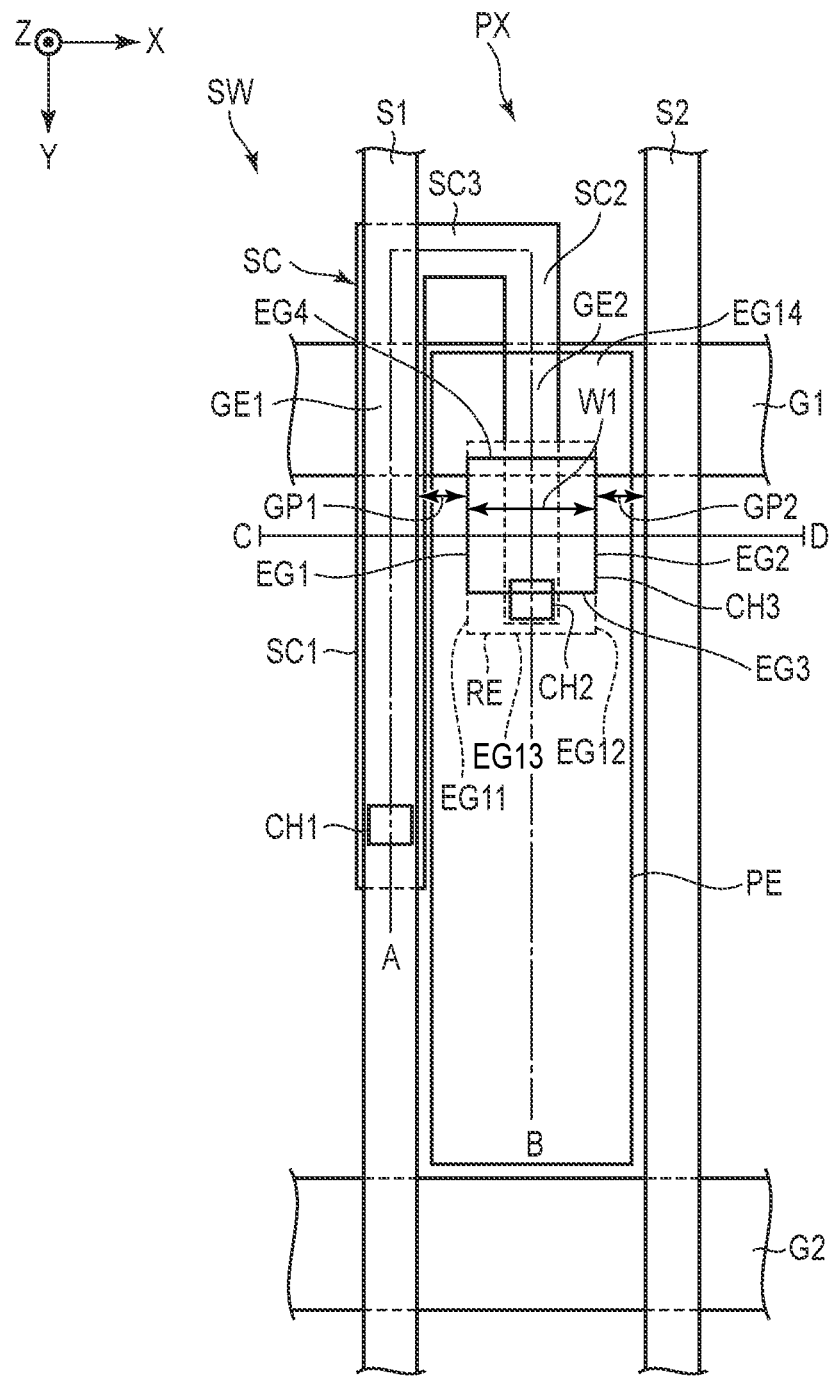
FIG. 2 is a plan view showing a configuration example of a pixel shown in FIG. 1.
Figure 12:
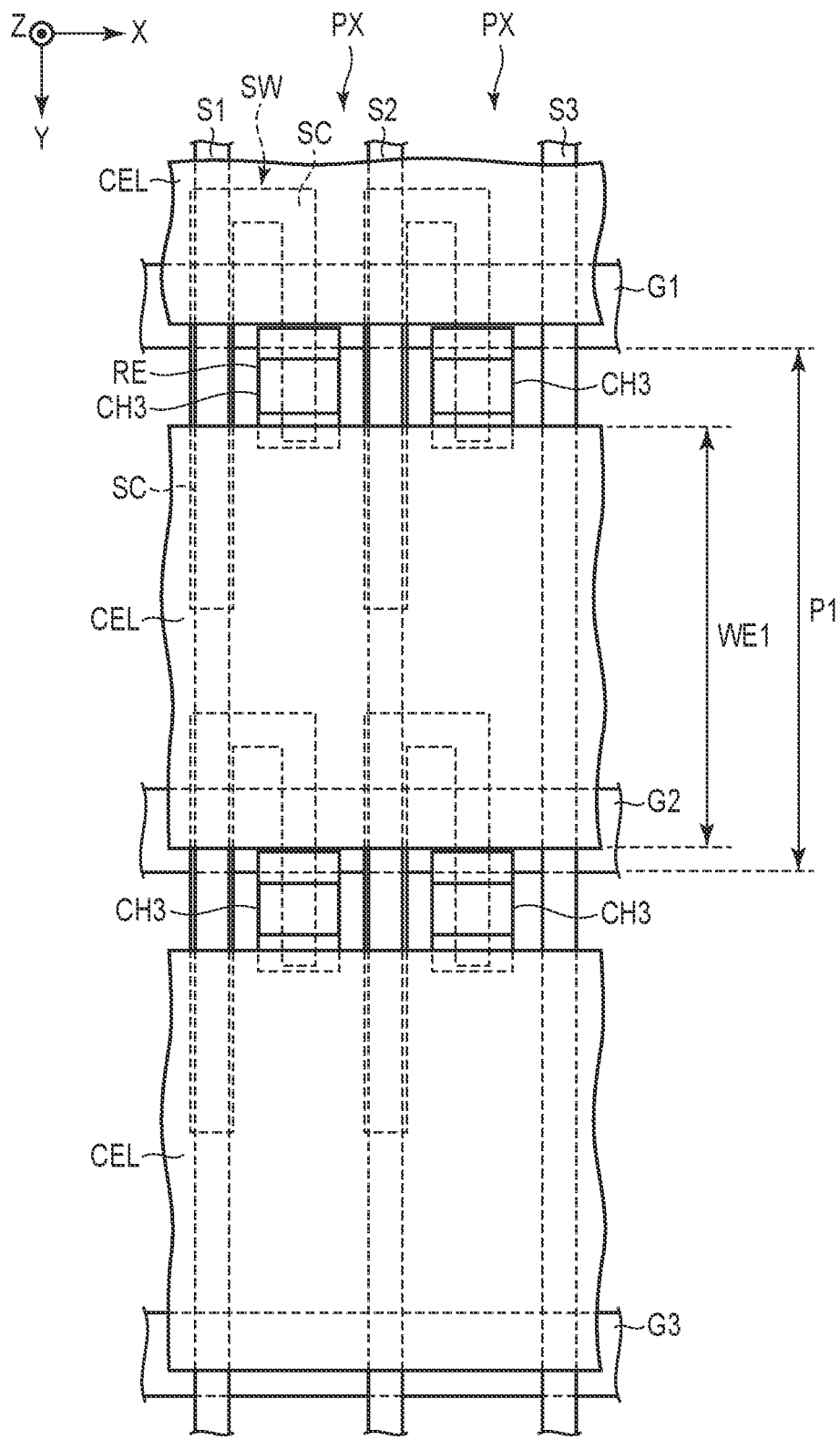
FIG. 12 is a plan view showing a configuration example of a capacitance electrode shown in FIG. 3.
Figure 13:
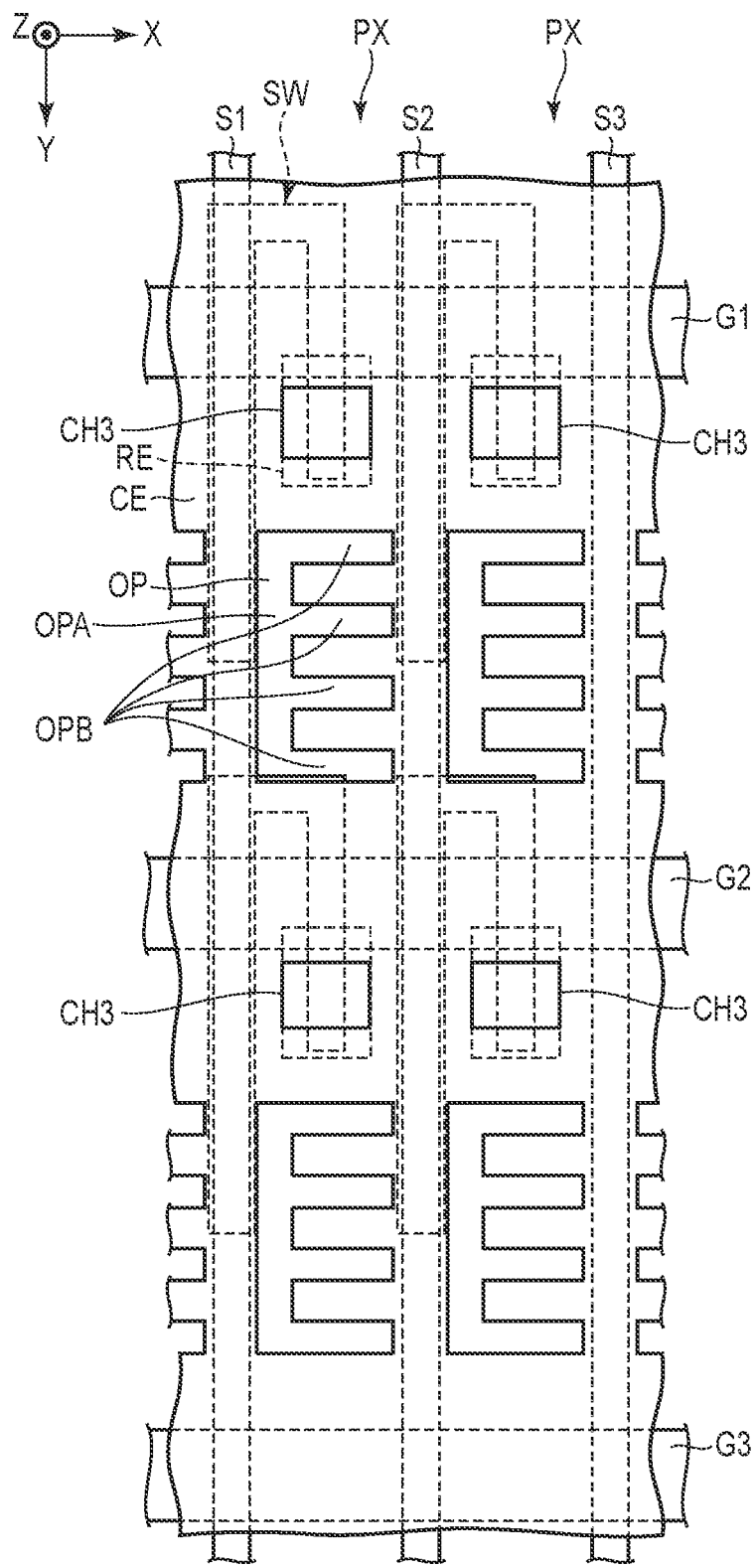
FIG. 13 is a plan view showing a configuration example of a common electrode shown in FIG. 3.

FIG. 2 is a plan view showing a configuration example of the pixel PX shown in FIG. 1. A capacitance electrode and the common electrode CE are not illustrated in FIG. 2. The detailed plan view of the capacitance electrode is shown in FIG. 12, and the detailed plan view of the common electrode CE is shown in FIG. 13.

Scanning lines G1 and G2 each extend along the first direction X, and are arranged with a space in the second direction Y. Signal lines S1 and S2 each extend along the second direction Y, and are arranged with a space in the first direction X. The pixel PX corresponds to an area delimited by the scanning lines G1 and G2 and the signal lines S1 and S2.

The switching element SW is a double-gate thin-film transistor in one example. The switching element SW comprises a relay electrode RE, a semiconductor layer SC, gate electrodes GE1 and GE2 and the like.

The relay electrode RE is located between the signal line S1 and the signal line S2. A part of the relay electrode RE overlaps the scanning line G1. The relay electrode RE has a width W1 in the first direction X. A gap GP1 between the relay electrode RE and the signal line S1 is less than the width W1. Similarly, a gap GP2 between the relay electrode RE and the signal line S2 is less than the width W1.

The semiconductor layer SC has a first part SC1, a second part SC2 and a third part SC3. The first part SC1 is located directly below the signal line S1. The first part SC1 extends along the second direction Y, and intersects the scanning line G1. The second part SC2 is located between the signal line S1 and the signal line S2. The second part SC2 extends along the second direction Y, and intersects the scanning line G1. The third part SC3 extends along the first direction X, and connects the first part SC1 and the second part SC2.

The semiconductor layer SC is connected to the signal line S1 in a through-hole CH1. The signal line S1 functions as a source electrode of the switching element SW. In addition, the semiconductor layer SC is connected to the relay electrode RE in a through-hole CH2. The relay electrode RE functions as a drain electrode of the switching element SW. The gate electrode GE1 corresponds to a part of the scanning line G1 which overlaps the first part SC1. The gate electrode GE2 corresponds to a part of the scanning line G1 which overlaps the second part SC2.

The pixel electrode PE is located in an area surrounded by the scanning lines G1 and G2 and the signal lines S1 and S2. In addition, the pixel electrode PE overlaps the scanning line G1, the relay electrode RE and the through-hole CH2. In the illustrated example, the pixel electrode PE has a substantially rectangular shape having long sides along the second direction Y, and is formed over substantially the entire pixel PX. The pixel electrode PE is connected to the relay electrode RE in a through-hole CH3. The through-hole CH3 overlaps a part of the through-hole CH2. That is, a part of the through-hole CH2 is located inside the through-hole CH3 in planar view. The through-holes CH1 to CH3 have a square shape in FIG. 2 but may have a circular shape or a shape rounded at corners.

The through-hole CH3 has edges EG1 to EG4. In addition, the relay electrode RE has edges EG11 to EG14. The edge EG1 overlaps the edge EG11. As shown in FIG. 2, the edge EG2 overlaps the edge EG12. The edge EG3 overlaps the through-hole CH2. The edge EG4 overlaps the scanning line G1.

FIG. 3 is a cross-sectional view of the display panel PNL along line A-B shown in FIG. 2. The display panel PNL of the present embodiment comprises a configuration corresponding a display mode using a lateral electric field along the main surface of a substrate.

The first substrate SUB1 comprises an insulating substrate 10, the switching element SW, insulating films 11 to 15, a capacitance electrode CEL, the pixel electrode PE, a filling material (filler) 100, the common electrode CE, an alignment film AL1 and the like.

The insulating substrate 10 is a transparent substrate such as a glass substrate or a resin substrate. The switching element SW is located on the insulating substrate 10. The switching element SW comprises the gate electrodes GE1 and GE2, the semiconductor layer SC and the relay electrode RE. The gate electrodes GE1 and GE2 are disposed on the insulating substrate 10, and are covered with the insulating film 11. The semiconductor layer SC is disposed on the insulating film 11, and is covered with the insulating film 12. The illustrated switching element SW is a bottom-gate thin-film transistor where the gate electrodes GE1 and GE2 are located closer to the insulating substrate 10 than the semiconductor layer SC. It should be noted that the switching element SW may be a top-gate thin-film transistor as will be described later. The signal line S1 and the relay electrode RE are disposed on the insulating film 12. The signal line S1 and the relay electrode RE are in contact with the semiconductor layer SC in the through-holes CH1 and CH2 penetrating the insulating film 12, respectively.

The semiconductor layer SC is formed of, for example, polycrystalline silicon. The gate electrodes GE1 and GE2, the relay electrode RE and the signal line S1 are formed of a metal material such as aluminum (Al), titanium (Ti), silver (Ag), molybdenum (Mo), tungsten (W), copper (Cu) or chromium (Cr), an alloy of these metal materials combined together or the like. The gate electrodes GE1 and GE2, the relay electrode RE and the signal line S1 may have a single-layer structure or a multilayer structure.

The insulating film 13 covers the switching element SW. The insulating film 13 has the through-hole CH3 penetrating to the relay electrode RE. The edges EG3 and EG4 of the through-hole CH3 correspond to the edges of the bottom of the through-hole CH3. The edges EG3 and EG4 do not overlap the edges EG13 and EG14 of the relay electrode RE. The edge EG3 is located on the edge EG14 side with respect to the edge EG13. The edge EG4 is located on the edge EG13 side with respect to the edge EG14. The capacitance electrode CEL is formed on the insulating film 13. The capacitance electrode CEL is located between the insulating film 13 and the pixel electrode PE. The capacitance electrode CEL does not overlap the through-hole CH3. The insulating film 14 covers the capacitance electrode CEL, and is also formed on the insulating film 13. A part of the insulating film 14 also extends inside the through-hole CH3. The pixel electrode PE is formed on the insulating film 14. The pixel electrode PE is in contact with the relay electrode RE in the through-hole CH3. Accordingly, a signal potential supplied to the signal line S1 is supplied to the pixel electrode PE via the relay electrode RE.

The insulating film 15 covers the pixel electrode PE. The insulating film 15 is also disposed inside the through-hole CH3, and also covers the pixel electrode PE inside the through-hole CH3. In the illustrated example, the insulating film 15 is also formed on the insulating film 14. The through-hole CH3 is filled with the filling material 100. The filling material 100 is in contact with the insulating film 15 inside the through-hole CH3. The filling material 100 protrudes toward the second substrate SUB2. As will be described later, the filling material 100 may not protrude toward the second substrate SUB2. The filling material 100 is, for example, formed in the same process and of the same material as a spacer formed in the first substrate SUB1. The common electrode CE is formed on the insulating film 15. In addition, the common electrode CE covers the filling material 100. Furthermore, in one example, the common electrode CE has a plurality of openings OP. The openings OP each are opposed to the pixel electrode PE. The common electrode CE is covered with the alignment film AL1. The alignment film AL1 is also disposed on the insulating film 15 in the openings OP. In the present embodiment, the relay electrode RE, the pixel electrode PE, the insulating film 15, the filling material 100, the common electrode CE and the alignment film AL1 are stacked in this order at a position overlapping the through-hole CH3.

The insulating films 11, 12, 14 and 15 are formed of, for example, an inorganic insulating material such as silicon oxide, silicon nitride or silicon oxynitride. The insulating film 13 is formed of, for example, an organic insulating material such as polyimide. The capacitance electrode CEL, the pixel electrode PE and the common electrode CE are formed of, for example, a transparent conductive material such as indium tin oxide (ITO) or indium zinc oxide (IZO).

In the present embodiment, the capacitance electrode CEL and the common electrode CE have the same potential. The pixel electrode PE has a different potential from the capacitance electrode CEL and the common electrode CE. In one example, a common potential which is common to each pixel is supplied to the capacitance electrode CEL and the common electrode CE. The common potential may be a DC potential or an AC potential. A signal potential corresponding to each pixel is supplied to the pixel electrode PE. A fringing field for driving the liquid crystal layer LC is mainly formed by the pixel electrode PE and the common electrode CE opposed to each other via the insulating film 15. A capacitance for holding the signal potential is formed by the pixel electrode PE and the common electrode CE opposed to each other via the insulating film 15 for sure, but is also formed by the capacitance electrode CEL and the pixel electrode PE opposed to each other via the insulating film 14.

The second substrate SUB2 comprises an insulating substrate 20, a light-shielding layer 21, a color filter layer 22, an overcoat layer 23, a spacer SP and an alignment film AL2.

The insulating substrate 20 is a transparent substrate such as a glass substrate or a resin substrate. The light-shielding layer 21 and the color filter layer 22 are disposed on a side of the insulating substrate 20 which is opposed to the first substrate SUB1. The light-shielding layer 21 is formed of, for example, resin colored in black, and delimits each pixel PX. In the illustrated example, the light-shielding layer 21 is opposed to the signal line S1, the switching element SW, the through-hole CH3 and the like. The overcoat layer 23 covers the color filter layer 22. The spacer SP is disposed on a side of the overcoat layer 23 which is opposed to the first substrate SUB1. The spacer SP is arranged at a position overlapping the filling material 100. The filling material 100 abuts the spacer SP via the common electrode CE and the alignment films AL1 and AL2. The alignment film AL2 covers the overcoat layer 23 and the spacer SP. It should be noted that the alignment film AL2 may not be arranged on the first substrate SUB1 side of the spacer SP. Similarly, the alignment film AL1 may not be arranged on the second substrate SUB2 side of the filling material 100.

The liquid crystal layer LC is located between the first substrate SUB1 and the second substrate SUB2. The first substrate SUB1 and the second substrate SUB2 are arranged such that the alignment film AL1 and the alignment film AL2 are opposed to each other. A predetermined cell gap is formed between the alignment film AL1 and the alignment film AL2 by a spacer which is not shown in the drawing. This cell gap is filled with the liquid crystal layer LC.

Figure 4:
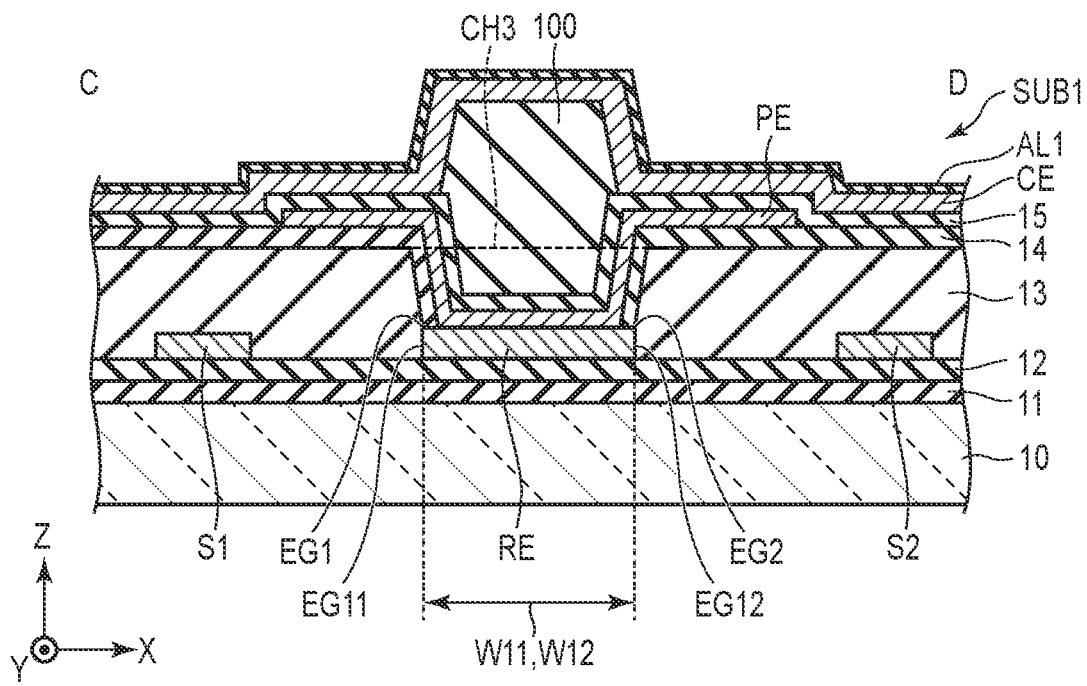
FIG. 4 is a cross-sectional view of a first substrate along line C-D shown in FIG. 2.

FIG. 4 is a cross-sectional view of the first substrate SUB1 along line C-D shown in FIG. 2. The illustration of the semiconductor layer SC between the insulating substrate 10 and the insulating film 11 is omitted in FIG. 4.

The through-hole CH3 has a width W11 in the first direction X. The relay electrode RE has a width W12 in the first direction X. In the present embodiment, the width W12 is less than or substantially equal to the width W11. Being "substantially equal" means that these widths are equal, or although the width W12 is slightly greater than the width W11, the difference is so slight that these widths can be regarded as equal. In the present embodiment, these widths are regarded as equal when the difference between these widths is about ±1 μm. In the illustrated example, the widths W11 and W12 are substantially equal, and the edge EG1 overlaps the edge EG11 and the edge EG2 overlaps the edge EG12. The width W11 of the through-hole CH3 is defined by the width of the bottom of the through-hole CH3. In addition, when the through-hole CH3 has a circular shape in a plane, the diameter is the width of the through-hole CH3.

Figure 5:
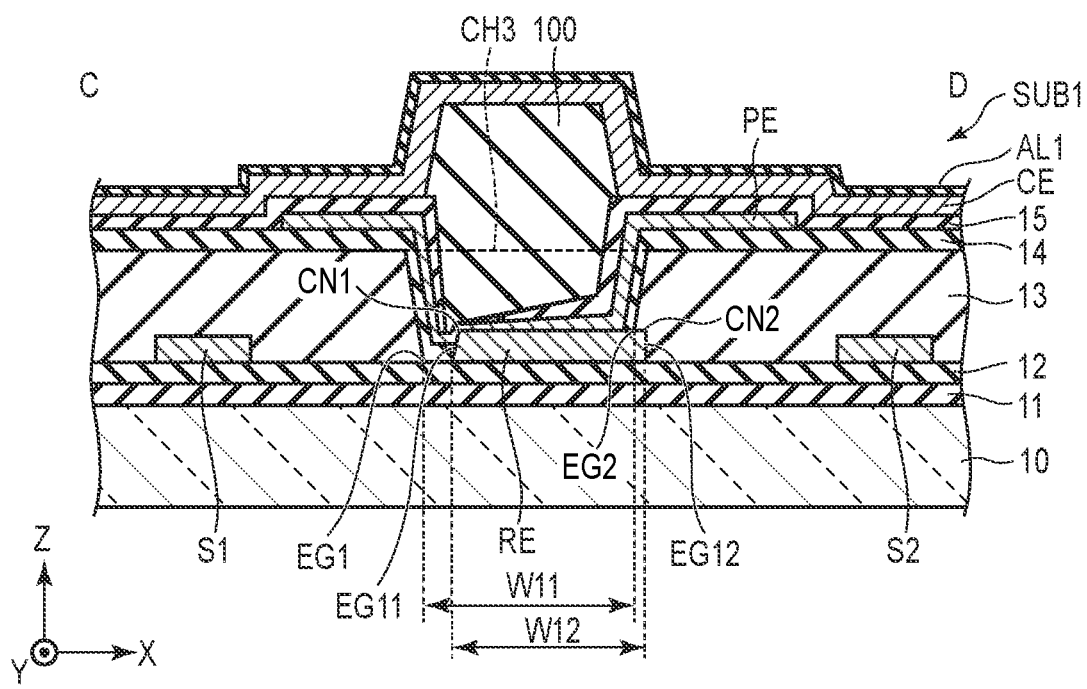
FIG. 5 is a modification of the cross-sectional view of the first substrate along line C-D shown in FIG. 2.

FIG. 5 is a modification of the cross-sectional view of the first substrate SUB1 along line C-D shown in FIG. 2. The configuration shown in FIG. 5 is different from the configuration shown in FIG. 4 in that the through-hole CH3 is shifted toward the signal line S1 with respect to the relay electrode RE.

In the modification, not only the relay electrode RE but also the insulating film 12 are located inside the through-hole CH3. Therefore, the insulating film 14 is in contact with the insulating film 12 inside the through-hole CH3. The edge EG1 of the through-hole CH3 is located closer to the signal line S1 than the edge EG11 of the relay electrode RE. In addition, the edge EG2 of the through-hole CH3 is located closer to the signal line S1 than the edge EG12 of the relay electrode RE.

The relay electrode RE has a corner CN1 on the signal line S1 side and a corner CN2 on the signal line S2 side. The corner CN1 is located inside the through-hole CH3 without being covered with the insulating film 13. The corner CN2 is covered with the insulating film 13. In addition, the pixel electrode PE covers the corner CN1. The insulating film 15 is, for example, disconnected at a position overlapping the corner CN1. The pixel electrode PE is exposed from the disconnected part of the insulating film 15. The filling material 100 covers the pixel electrode PE exposed at the corner CN1.

When the definition of the display device is increased, in order to maintain a certain distance or more to prevent the occurrence of a short circuit between the relay electrode RE and the signal line S1 and between the relay electrode RE and the signal line S2, the width W12 of the relay electrode RE is set to substantially equal to or less than the width W11 of the through-hole CH3 in some cases. Therefore, if the relay electrode RE and the through-hole CH3 are misaligned with each other, the corner CN1, that is, a step between the upper surface of the relay electrode RE and the insulating film 12 is located inside the through-hole CH3, the insulating film 15 is disconnected by the step and cannot completely cover the pixel electrode PE. Consequently, the pixel electrode PE and the common electrode CE formed on the pixel electrode PE via the insulating film 15 may be short circuited.

According to the present embodiment, the filling material 100 is interposed between the pixel electrode PE and the common electrode CE at the position overlapping the through-hole CH3. Therefore, even if the pixel electrode PE is exposed at the corner CN1, the pixel electrode PE and the common electrode CE are kept insulated from each other by the filling material 100. Consequently, the occurrence of a short circuit between the pixel electrode PE and the common electrode CE can be prevented.

FIG. 6 is a cross-sectional view showing a detailed configuration example of the relay electrode RE shown in FIG. 5.

The relay electrode RE has a first layer REA formed of titanium, a second layer REB formed of aluminum, and a third layer REC formed of titanium. Due to the difference in etching rate between the layers, when the relay electrode RE is etched, the second layer REB formed of aluminum is reduced more than the first layer REA and the third layer REC formed of titanium. Therefore, the third layer REC protrudes more than the second layer REB in some cases. The protruding part of the third layer REC corresponds to the corner CN1. Consequently, the coverage of the insulating film 15 is degraded in some cases. Even in such a case, the occurrence of a short circuit between the pixel electrode PE and the common electrode CE can be suppressed as described above.

Figure 7:
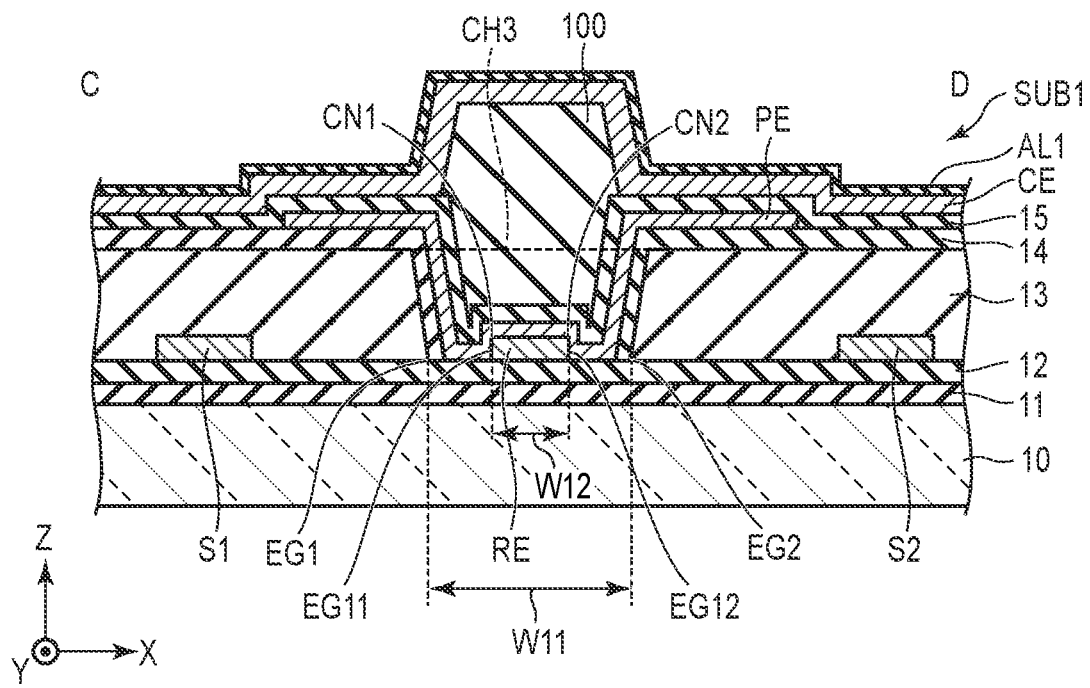
FIG. 7 is a cross-sectional view showing the first modification of the first substrate.

FIG. 7 is a cross-sectional view showing the first modification of the first substrate SUB1. The configuration shown in FIG. 7 is different from the configuration shown in FIG. 4 in that the width W12 of the relay electrode RE is less than the width W11 of the through-hole CH3.

In this modification, not only the relay electrode RE but also the insulating film 12 are in contact with the insulating film 14 and the pixel electrode PE inside the through-hole CH3. The edge EG1 of the through-hole CH3 is located closer to the signal line S1 than the edge EG11 of the relay electrode RE. In addition, the edge EG2 of the through-hole CH3 is located closer to the signal line S2 than the edge EG12 of the relay electrode RE.

The corners CN1 and CN2 are located inside the through-hole CH3 without being covered with the insulating film 13. In addition, the pixel electrode PE covers the corners CN1 and CN2. The insulating film 15 is disconnected at, for example, positions overlapping the corners CN1 and CN2 (that is, steps) in some cases. However, even when the pixel electrode PE is exposed from the disconnected parts of the insulating film 15, the exposed pixel electrode PE is covered with the filling material 100. Therefore, the occurrence of a short circuit between the pixel electrode PE and the common electrode CE can be prevented.

Also in the first modification, the same effects as the above-described embodiment can be obtained.

Figure 8:
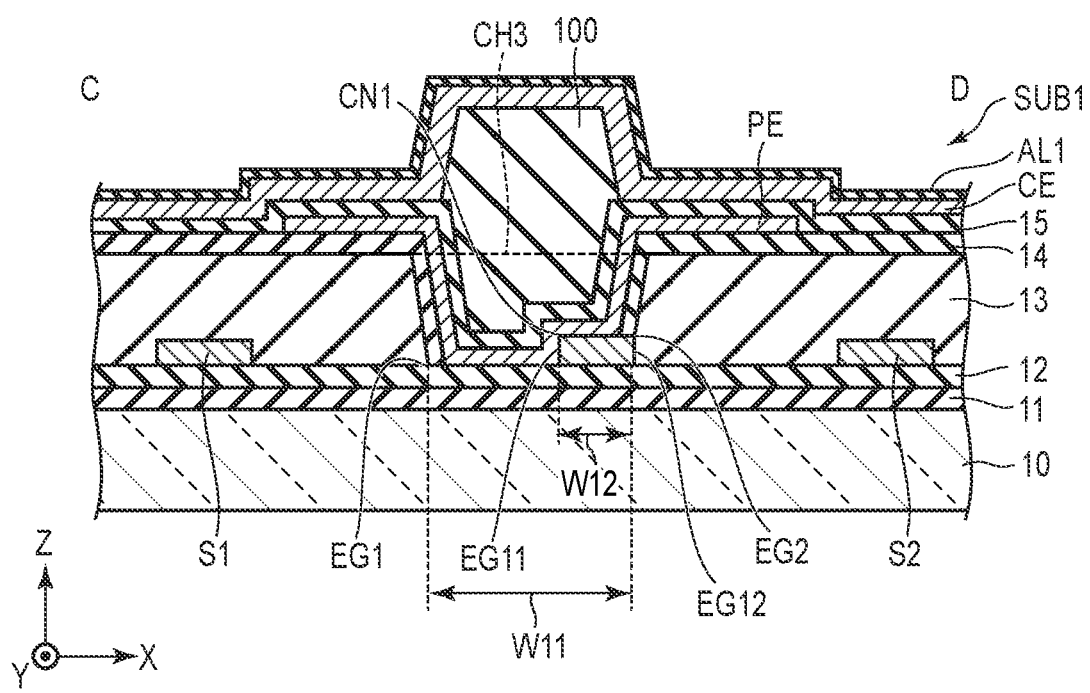
FIG. 8 is a cross-sectional view showing the second modification of the first substrate SUB1.

FIG. 8 is a cross-sectional view showing the second modification of the first substrate SUB1. The configuration shown in FIG. 8 is different from the configuration shown in FIG. 7 in that the relay electrode RE is located on the signal line S2 side.

The edge EG1 of the through-hole CH3 is located closer to the signal line S1 than the edge EG11 of the relay electrode RE. In addition, the edge EG2 of the through-hole CH3 overlaps the edge EG12 of the relay electrode RE. The corner CN1 is located inside the through-hole CH3 without being covered with the insulating film 13. In addition, the pixel electrode PE covers the corner CN1 inside the through-hole CH3, and also covers the surface of the insulating film 12. The other configuration is the same as the configuration of FIG. 7, and description thereof is omitted.

Also in the second modification, the same effects as the above-described embodiment can be obtained.

Figure 9:
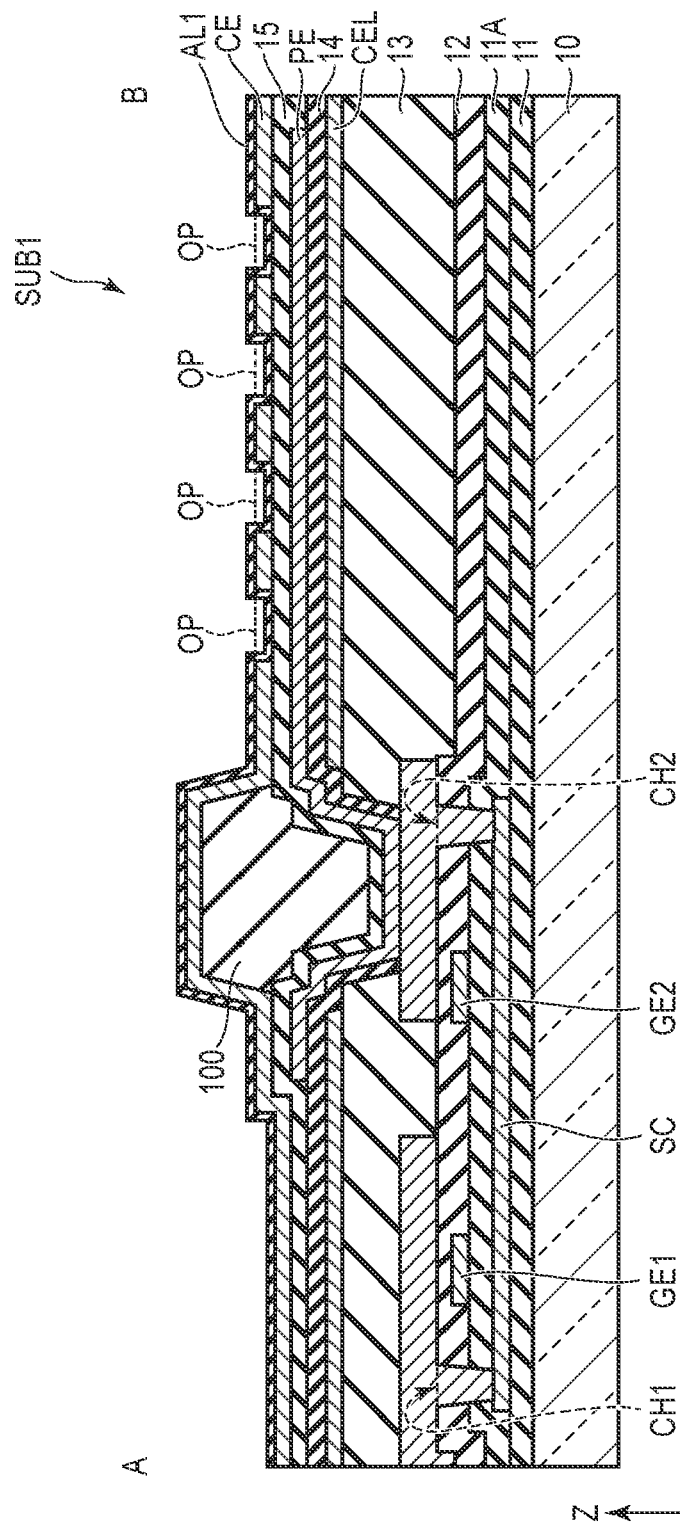
FIG. 9 is a cross-sectional view showing the third modification example of the first substrate.

FIG. 9 is a cross-sectional view showing the third modification of the first substrate SUB1. The configuration shown in FIG. 9 is different from the configuration shown in FIG. 3 in that the switching element SW is a top-gate thin-film transistor.

The insulating film 11 covers the insulating substrate 10. The semiconductor layer SC is located on the insulating film 11. An insulating film 11A covers the semiconductor layer SC. The gate electrodes GE1 and GE2 are located on the insulating film 11A. The insulating film 12 covers the gate electrodes GE1 and GE2. The gate electrodes GE1 and GE2 are located closer to the second substrate SUB2 than the semiconductor layer SC. The through-holes CH1 and CH2 penetrate the insulating films 11A and 12 to the semiconductor layer SC.

Also in the third modification, the same effects as the above-described embodiment can be obtained.

FIG. 10 is a cross-sectional view showing the fourth modification of the first substrate SUB1. The configuration shown in FIG. 10 is different from the configuration shown in FIG. 3 in that the first substrate SUB1 does not have the capacitance electrode CEL.

The pixel electrode PE is located on the insulating film 13. In addition, the pixel electrode PE is in contact with a side surface SS of the through-hole CH3. The insulating film 15 covers the pixel electrode PE, and is also in contact with the insulating film 13.

Also in the fourth modification, the same effects as the above-described embodiment can be obtained.

Figure 11:
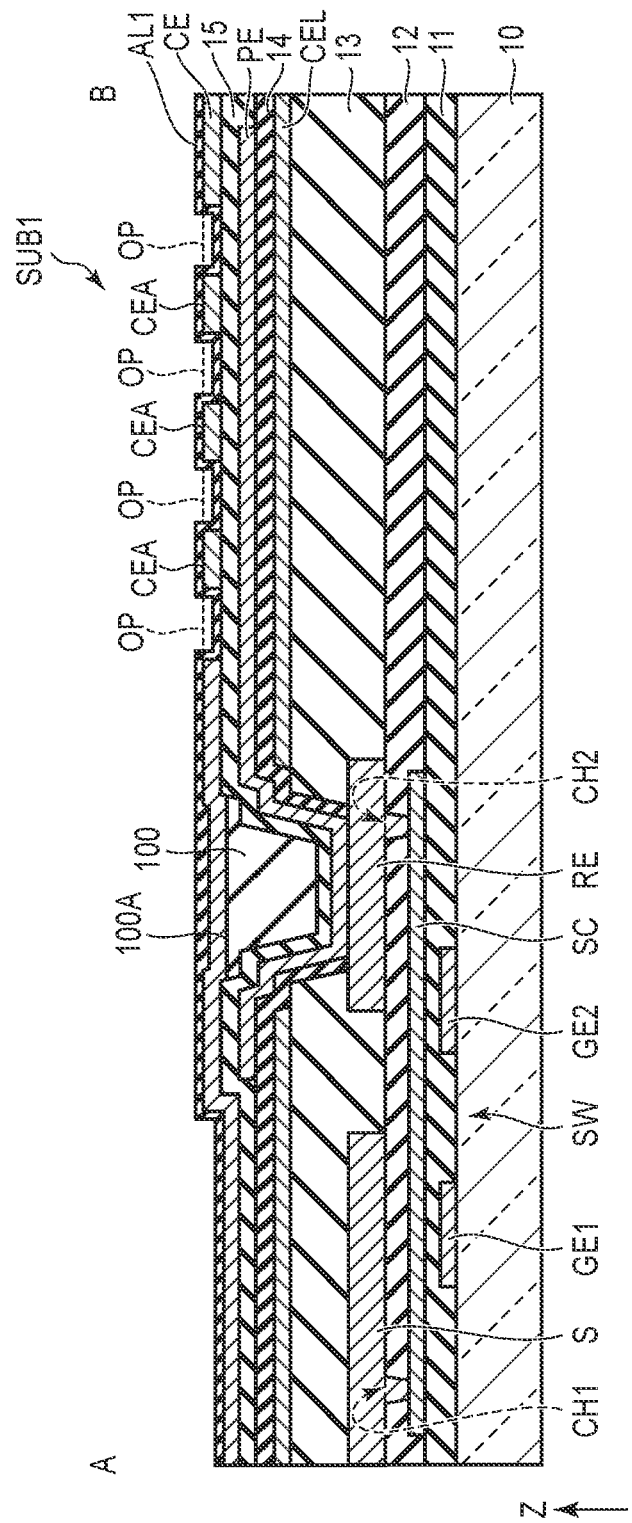
FIG. 11 is a cross-sectional view showing the fifth modification of the first substrate.

FIG. 11 is a cross-sectional view showing the fifth modification of the first substrate SUB1. The configuration shown in FIG. 11 is different from the configuration shown in FIG. 3 in that the filling material 100 does not protrude toward the second substrate SUB2.

The filling material 100 has an upper surface 100A on the second substrate SUB2 side. In addition, a part of the upper surface of the common electrode CE which is located between the openings OP is referred to as an upper surface CEA. The upper surface 100A is located closer to the insulating substrate 10 than the upper surface CEA. At this time, the spacer SP of the second substrate SUB2 may abut the first substrate SUB1 at a position overlapping the filling material 100 or may be separated from the first substrate SUB1.

Also in the fifth modification, the same effects as the above-described embodiment can be obtained.

FIG. 12 is a plan view showing a configuration example of the capacitance electrode CEL shown in FIG. 3. The illustration of the pixel electrode PE shown in FIG. 2 is omitted in FIG. 12. In addition, the illustration of the common electrode CE shown in FIG. 13 is omitted.

Each capacitance electrode CEL overlaps the pixels PX arranged in the first direction X. More specifically, the capacitance electrodes CEL each extend along the first direction X, and are arranged at intervals along the second direction Y. The capacitance electrodes CEL are formed in a strip shape having a substantially constant width WE1. The width WE1 is less than a pitch P1 of scanning lines G1 to G3 which are adjacent to each other. Here, the width WE1 and the pitch P1 are both defined along the second direction Y. The capacitance electrodes CEL partly overlap the scanning lines G1 to G3, signal lines S1 to S3, the semiconductor layers SC and the relay electrodes RE, but does not overlap the through-holes CH3. That is, the through-holes CH3 arranged along the first direction X are located between the capacitance electrodes CEL which are adjacent to each other along the second direction Y.

FIG. 13 is a plan view showing a configuration example of the common electrode CE shown in FIG. 3. The illustration of the pixel electrode PE shown in FIG. 2 is omitted in FIG. 13. In addition, the illustration of the capacitance electrode CEL shown in FIG. 12 is omitted.

The common electrode CE overlaps the pixels PX arranged along the first direction X and the second direction Y. In one example, the common electrode CE is formed of a single material. The common electrode CE overlaps the relay electrodes RE and the through-holes CH3. The common electrode CE has the openings OP in the respective pixels PX. One opening OP overlaps one pixel electrode. The openings OP are located between the adjacent signal lines S1 to S3 and between the adjacent scanning lines G1 to G3. The openings OP do not overlap the relay electrodes RE. In the illustrated example, each opening OP has a first part OPA extending in the second direction Y and a plurality of second parts OPB extending in the first direction X. The second parts OPB are continuous with the first part OPA. Since the common electrode CE has the opening OP, an area where the common electrode CE and the pixel electrode PE overlap each other is less than an area where the capacitance electrode CEL and the pixel electrode PE overlap each other.

As described above, according to the present embodiment, a display device capable of suppressing the reduction of display quality associated with the increase of definition can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate;
a second substrate opposed to the first substrate; and
a capacitance electrode, wherein
the first substrate comprises:
    an insulating substrate;
    a switching element located on the insulating substrate and having a relay electrode;
    an organic insulating film covering the switching element, and having a first through-hole penetrating to the relay electrode;
    a pixel electrode located between the organic insulating film and the second substrate, and being in contact with the relay electrode via the first through-hole;
    a first capacitance insulating film covering the pixel electrode;
    a filler having an insulation property filled in at least the first through-hole, and located on the pixel electrode and the first capacitance insulating film; and
    a common electrode covering the filler,
the capacitance electrode located between the organic insulating film and the pixel electrode,
the pixel electrode extends on the capacitance electrode, and
the capacitance electrode does not overlap the first through-hole.

2. The display device of claim 1, wherein a same potential as the common electrode is supplied to the capacitance electrode.

3. The display device of claim 1, wherein a width of the relay electrode is substantially equal to a width of the first through-hole.

4. The display device of claim 1, wherein a width of the relay electrode is less than a width of the first through-hole.

5. The display device of claim 1, wherein the filler protrudes toward the second substrate.

6. The display device of claim 1, wherein
the second substrate comprises a spacer protruding toward the first substrate at a position overlapping the filler, wherein
the filler supports the spacer via the common electrode.

7. The display device of claim 1, wherein
the second substrate comprises a spacer protruding toward the first substrate at a position overlapping the filler, and
a part of the common electrode which is located on the filler abuts the spacer.

8. The display device of claim 1, wherein the switching element has a semiconductor layer, and a gate electrode located closer to the insulating substrate than the semiconductor layer.

9. The display device of claim 1, wherein the switching element has a semiconductor layer, and a gate electrode located closer to the second substrate than the semiconductor layer.

10. The display device of claim 1, further comprising an inorganic insulating film being in contact with a lower surface of the relay electrode, wherein
a step between the relay electrode and the inorganic insulating film is disposed inside the first through-hole.

11. The display device of claim 1, wherein
the switching element comprises a semiconductor layer connected to the relay electrode in a second through-hole, and
a part of the second through-hole is located inside the first through-hole in planar view.

12. The display device of claim 1, wherein the common electrode is opposed to the pixel electrode via at least the filler in the first through-hole, and is opposed to the pixel electrode via at least the first capacitance insulating film in other than the first through-hole.

13. The display device of claim 12, wherein the common electrode and the pixel electrode are located such that a first distance therebetween in the first through-hole is larger than a second distance therebetween in other than the first through-hole.

14. The display device of claim 1, wherein the common electrode and the insulating substrate are located such that a third distance therebetween in the first through-hole is larger than a fourth distance therebetween in other than the first through-hole.

15. A display device substrate comprising:
an insulating substrate;
a switching element located on the insulating substrate and having a relay electrode;
an organic insulating film covering the switching element, and having a first through-hole penetrating to the relay electrode;
a pixel electrode located farther from the insulating substrate than the organic insulating film, and being in contact with the relay electrode via the first through-hole;
a first capacitance insulating film covering the pixel electrode;
a filler having an insulation property filled in at least the first through-hole, and located on the pixel electrode and the first capacitance insulating film;
a common electrode covering the filler; and
a capacitance electrode located between the organic insulating film and the pixel electrode, wherein
the pixel electrode extends on the capacitance electrode, and
the capacitance electrode does not overlap the first through-hole.

16. The display device substrate of claim 15, wherein a same potential as the common electrode is supplied to the capacitance electrode.

17. The display device substrate of claim 15, wherein a width of the relay electrode is substantially equal to a width of the first through-hole.

18. The display device substrate of claim 15, wherein a width of the relay electrode is less than a width of the first through-hole.

19. The display device substrate of claim 15, wherein the filler protrudes toward the opposite side of the insulating substrate side.

20. The display device substrate of claim 15, wherein the switching element has a semiconductor layer, and a gate electrode located closer to the insulating substrate than the semiconductor layer.

21. The display device substrate of claim 15, wherein the switching element has a semiconductor layer, and a gate electrode located the opposite side of the insulating substrate side of the semiconductor layer.

22. The display device substrate of claim 15, further comprising an inorganic insulating film being in contact with a lower surface of the relay electrode, wherein a step between the relay electrode and the inorganic insulating film is disposed inside the first through-hole.

23. The display device substrate of claim 15, wherein
the switching element comprises a semiconductor layer connected to the relay electrode in a second through-hole, and
a part of the second through-hole is located inside the first through-hole in planar view.

24. The display device substrate of claim 15, wherein the common electrode is opposed to the pixel electrode via at least the filler in the first through-hole, and is opposed to the pixel electrode via at least the first capacitance insulating film in other than the first through-hole.

25. The display device of claim 24, wherein the common electrode and the pixel electrode are located such that a first distance therebetween in the first through-hole is larger than a second distance therebetween in other than the first through-hole.

26. The display device of claim 15, wherein the common electrode and the insulating substrate are located such that a third distance therebetween in the first through-hole is larger than a fourth distance therebetween in other than the first through-hole.

* * * * *